Oct. 4, 1955  W. H. ZINN  2,719,823
NEUTRONIC REACTOR RADIATION INDICATOR
Filed Aug. 17, 1945  4 Sheets-Sheet 1

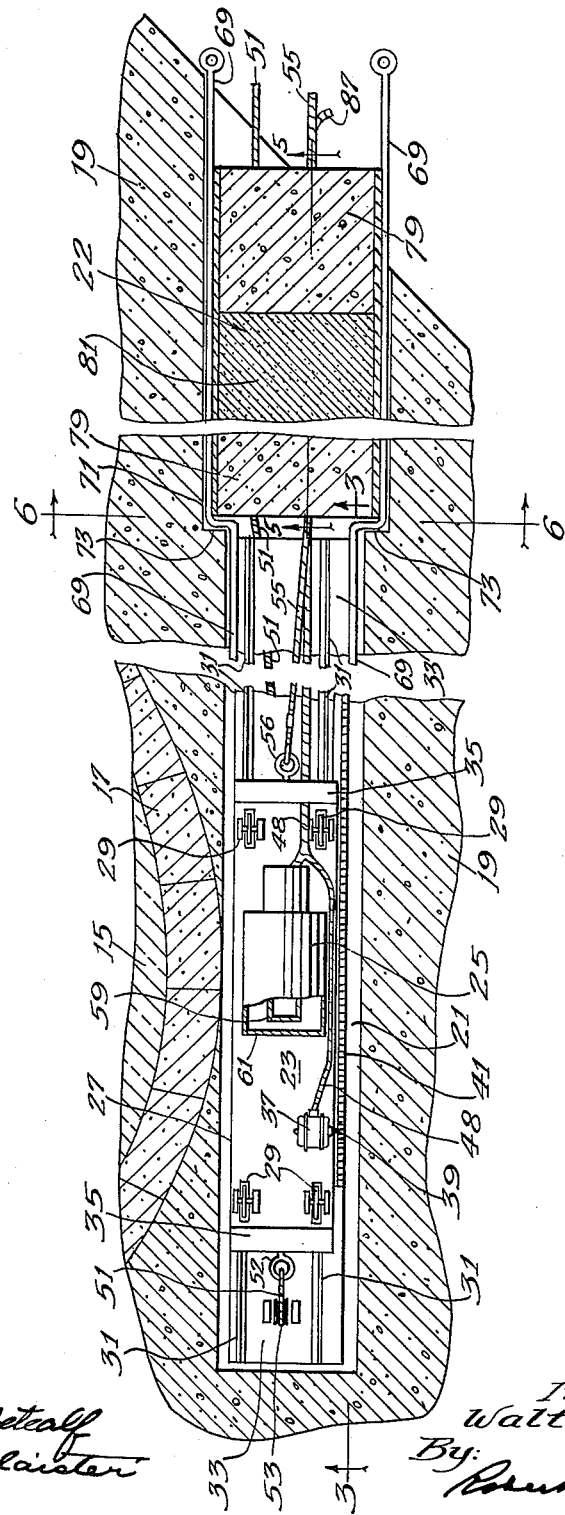

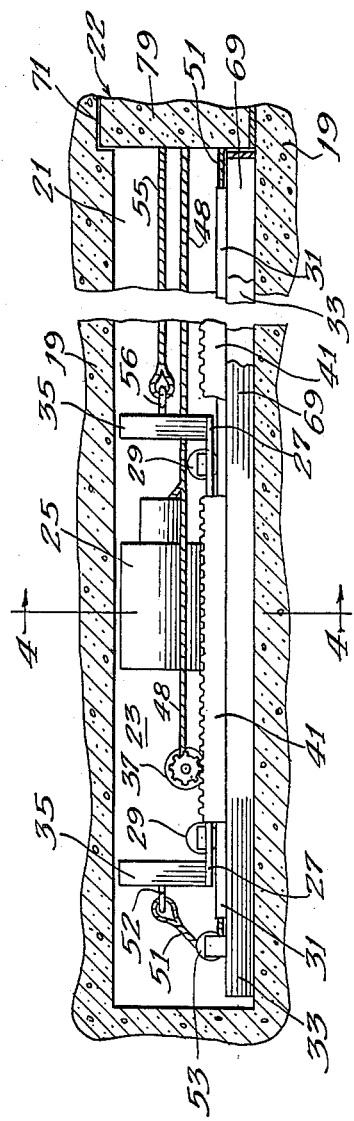

Oct. 4, 1955  W. H. ZINN  2,719,823
NEUTRONIC REACTOR RADIATION INDICATOR
Filed Aug. 17, 1945  4 Sheets-Sheet 4

Inventor:
Walter H. Zinn
By:
Attorney

United States Patent Office 2,719,823
Patented Oct. 4, 1955

2,719,823

NEUTRONIC REACTOR RADIATION INDICATOR

Walter H. Zinn, Chicago, Ill., assignor to the United States of America as represented by the United States Atomic Energy Commission Application August 17, 1945, Serial No. 611,162

8 Claims. (Cl. 204—193)

The present invention relates to neutronic reactor systems and is concerned particularly with apparatus for indicating the neutron densities present in such systems under varying operating conditions.

The term neutronic reactor system is used herein to define, generally, complete systems designed for initiating and carrying out chain nuclear reactions. The term neutronic reactor includes those parts of a neutronic reaction system wherein neutrons are developed and reserved for sustaining such reactions. The usual neutronic reactor comprises a plurality of bodies of or containing fissionable material, such as uranium metal, arranged in a symmetrical, spatial lattice with a suitable moderating substance such as carbon, heavy water, or beryllium occupying the interstices of the lattice. The moderating substance has the function of slowing down the fast neutrons released as an incident to the fission process thereby making available thermal or low energy neutrons which are capable of producing further fissions, and thus continuing the chain reaction. A main radiation shield, usually of cast, monolithic concrete construction, several feet thick, is disposed about the reactor to protect the operating personnel from radioactive emanations developed in the reactor. A neutronic reactor system is disclosed in the patent of Enrico Fermi and Leo Szilard, entitled "Chain Reactions," No. 2,708,656, filed December 19, 1944.

During the operation of a neutronic reactor the neutron density within the reacting portion of the reactor may vary from a very low value when the reactor is starting up to a very high value when the reactor is operating at full power, the neutron density being proportional, in general, to the rate of power output of the reactor. Because of this characteristic, neutron density measurements provide a convenient indication of the rate of power output and are frequently used for that purpose. This practice creates a need for neutron density indicating means which is capable of accurate and reliable operation over the widely varying neutron density ranges encountered in reactor operation. However, efforts to provide neutron density indicating apparatus capable of operation over ranges of this order have been unsuccessful. Apparatus which is sensitive enough to accurately measure neutron densities at starting values becomes inoperative when the neutron density increases to even a fraction of the amount encountered in normal full power operation of the reactor. Similarly, indicators capable of operation at the extremely high densities encountered during full power operation are too insensitive to be of any use during the periods of low density operations encountered when the reactor is being started up.

As a result, it has been considered necessary heretofore to utilize a plurality of neutron density indicating means, for example, a high sensitivity indicator for use in starting the reactor, a medium range indicator for low power operation of the reactor, and a high capacity indicator for full power operation. This arrangement is not only extremely undesirable from the viewpoint of requiring a multiplicity of apparatus and complicated control circuits, but in addition, it is cumbersome and awkward to use, and there is some accompanying risk that the wrong indicator or wrong scale may be selected.

The principal object of the present invention is to provide a neutron density indicating means which will be accurate and reliable in operation over the wide ranges of neutron density encountered in the normal operation of a neutronic reactor. It is also an object of the invention that this indicating means shall be simple in construction and easy to operate.

As will hereinafter appear, these objects are accomplished by the provision of a novel, neutron density indicating means which employs a movable, exploratory element arranged to move within a passageway extending through the main reactor shield in such a manner that progressively increasing thicknesses of the shield are interposed between the exploratory unit and the reacting portion of this reactor as the exploratory element is moved along this passageway. The arrangement permits the use of a neutron density indicating means of sufficiently high sensitivity to take care of starting operations and requires only the determination of the proportionality factor introduced by the shield to permit its use at any increased neutron density which may be encountered during the use of the apparatus.

Various novel structural arrangements which contribute to the successful operation of the apparatus of the invention and a more complete exposition of its principles and mode of operation will be found in the following description and the accompanying drawings of one preferred embodiment thereof. In the drawings:

Fig. 2 is an enlarged plan view, partially in section, showing certain of the structural details of the reactor and the exploratory unit of the neutron density indicating means;

Fig. 3 is a fragmentary sectional view on the line 3—3 of Fig. 2;

Fig. 4 is a sectional view on the line 4—4 of Fig. 3;

Figure 5:
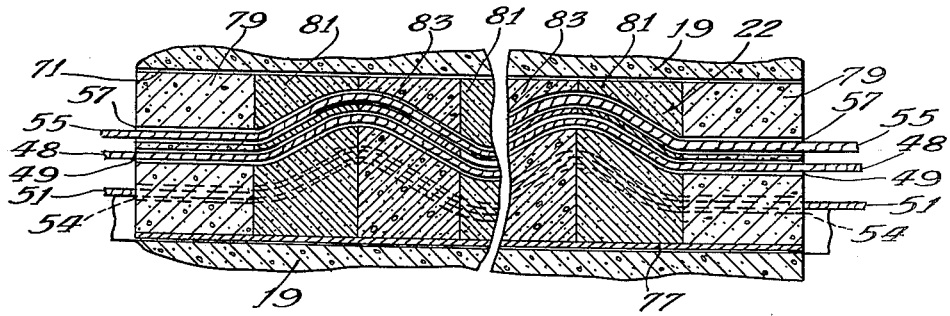
Figure 6:
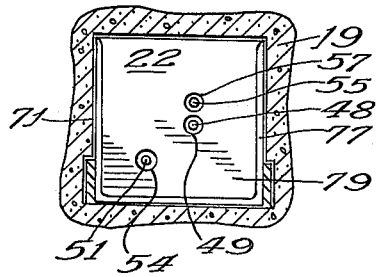
Figure 7:
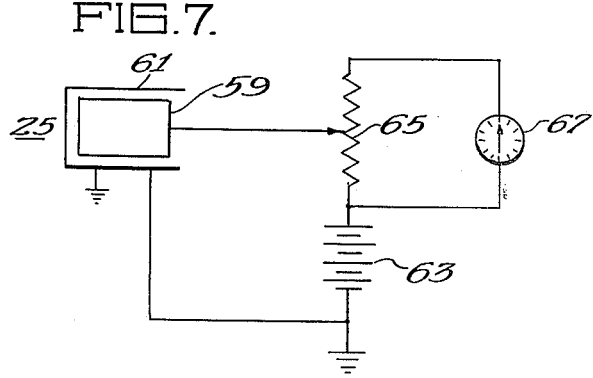

Figs. 5 and 6 are sectional views on the lines 5—5 and 6—6 of Fig. 2, respectively;

Fig. 7 is a circuit diagram of the neutron density indicating means; and

Figure 8:
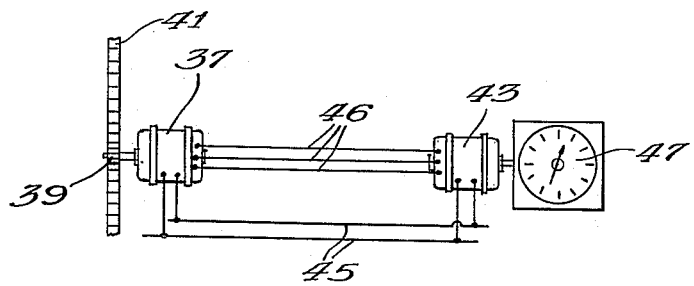

Fig. 8 is a circuit diagram of the selsyn position indicating means used in connection with the exploratory unit.

Figure 1:
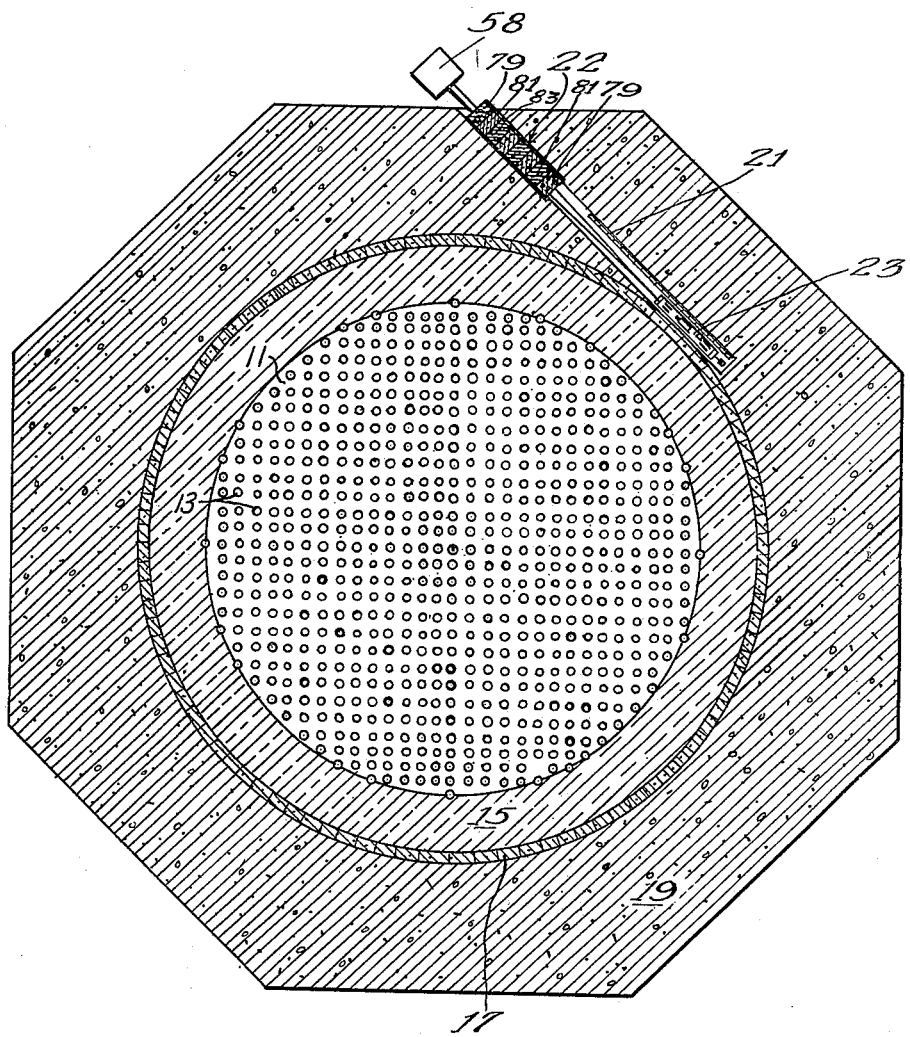
Fig. 1 is a somewhat diagrammatic, transverse sectional view through a neutronic reactor which is provided with neutron density indicating means in accordance with the present invention.

The neutronic reactor system illustrated in Fig. 1 includes a central reacting portion 11 which may be spherical or cylindrical in form and which comprises a plurality of bodies 13 of chain reacting material, such as uranium metal, arranged in a symmetrical, spatial lattice. The space between the bodies 13 of reacting material is occupied by a suitable moderating substance which may comprise blocks of graphitic carbon, beryllium, heavy water, etc. A neutron reflecting shield 15 comprising blocks of graphitic carbon is disposed about the central reacting portion of the reactor. This shield 15 serves to reflect substantial quantities of neutrons, which would otherwise be lost back into the reacting portion of the reactor, and together with the central reacting portion 11 comprises the neutronic reactor of the system.

An inner radiation shield 17 of material having high neutron absorbing characteristics, such as a lead cadmium alloy is disposed about the neutronic reactor and serves, in effect, as a lining for the main outer shield 19 which is of monolithic, cast concrete construction several feet thick. In the particular device illustrated in the drawings, the main outer shield 19 is provided with an access passageway 21 which extends through the main outer shield 19 to the outer edge of the inner radiation shield 17. The passageway 21 is about 12 inches square in cross-section, it is axially straight, and it is disposed substantially tangentially to the reacting portion 11 of the reactor. The passageway 21 is normally closed at its outer end by a shield plug 22 which will be described in detail in a subsequent paragraph.

The neutron density indicating means includes an ionization chamber-type exploratory unit 23 which is adapted to be moved through the access passageway 21. The effect of the tangential positioning of the passageway 21 relative to the reacting portion 11 of the reactor is such that progressively increasing thicknesses of the main outer shield 19 will be interposed between the exploratory unit 23 and the reactor as that unit is moved outwardly along the passageway. This arrangement will obviously act to reduce the neutron density at the exploratory unit 23 as that unit is moved along the passageway 21 and will thereby permit operation of the density indicating means over a very wide range of neutron densities.

It will be apparent that the particular location of the access passageway 21 through which the exploratory unit 23 of the neutron density indicating means is moved is susceptible of considerable variation. In general, it is preferred that the passageway be axially straight and that it extend tangentially to the contour surface of equal neutron density which lies just outside the inner shield 17, but other arrangements might be more satisfactory in particular circumstances, and such other arrangements are within the contemplation of the invention. If the reacting portion of the reactor is cylindrical or spherical, satisfactory operation will be assured if the access passageway for the neutron density indicating means extends tangentially to a circular cross-section of the reacting portion, preferably, but not necessarily, to a central circular section.

The exploratory unit 23 of the neutron density indicating means illustrated in the drawing includes a simple, ionization chamber exploratory element 25 which is supported upon a carriage. The carriage comprises a flat, metallic bed plate 27 of suitable dimensions having a pair of wheels 29 at either end thereof. The wheels 29 are adapted to engage a trackway provided by a pair of metallic track members 31 which are welded or otherwise rigidly affixed to the main channel support 33 for the exploratory means. In order that the ionization chamber exploratory element 25 shall not be subjected to substantial radiation axially of the passageway 23, the carriage is provided with a pair of relatively thick metallic end plates or shields 35 each of which is supported in upright position at one end of the carriage. The outline dimensions of these end plates or shields 35 are such that they substantially cover the ionization chamber element 25 and prevent radiations moving axially of the passageway from impinging thereon.

In view of the fact that differing thicknesses of the main outer shield 19 will be interposed between the ionization chamber exploratory element 25 and the reacting portion 11 of the neutronic reactor as the exploratory unit 23 is moved along the passageway 21 provided therefor, it is essential that the operators of the reactor shall be informed at all times of the exact linear position of the ionization chamber exploratory element 25. Only when the exact linear position of the exploratory element 25 is known is it possible to apply the correct proportionality factor to the indicated neutron density. While various types of indicating means may be used for this purpose, particularly satisfactory results have been obtained by the use of a selsyn indicating means. In the particular apparatus illustrated, this means includes a transmitter unit 37, supported upon the carriage bed plate 27 and mechanically connected by suitable gearing 39 to a rack 41 which extends along one side of the main channel support 33, and a receiver unit 43 (Fig. 8) located externally of the main shield 19. The selsyn units are of conventional type having single phase primaries and three phase secondaries. Only the primaries are energized, and the units may be connected, as shown in Fig. 8. In that circuit the single phase alternating current supply for the primaries is illustrated at 45 and the three-phase interconnection of the secondaries is effected by the leads indicated at 46. Any suitable position indicating means, such as the dial and pointer 47 which is mechanically connected to the receiver unit 43 may be utilized for obtaining visual indication of the operation of the selsyn system. The electrical connections to the selsyn system are made through a multi-conductor cable 48 which passes through a tortuous duct 49 in the closure plug 22.

The exploratory unit 23 is normally moved along the passageway 21 rather slowly and the most satisfactory means of accomplishing this appears to be by a mechanical drive mechanism. One suitable arrangement, illustrated generally in Figs. 2 and 3, includes a flexible cable 51, which is attached to the forward end of the carriage by means of a hook eye 52 affixed to the inner shield plate 35 and which passes over a grooved pulley wheel 53 supported at the inner end of the main channel support 33. The cable 51 extends underneath the carriage and through a tortuous duct 54 provided in the closure plug shield 22, which is in place during normal operation of the apparatus. A second flexible cable 55, which may comprise the other end of the cable 51, is connected to the other end of the carriage by a second hook eye 56, and this cable extends to the outside of the main shield 19 through a tortuous duct 57 provided in the closure plug shield 22. The cables 51 and 55 are connected to a reversible slow speed, motor drive apparatus indicated generally at 58, or equivalent means, operable to move the carriage and the exploratory element 25 inwardly and outwardly along the passageway 21. Any well-known motor drive apparatus of this type can be used.

While various types of neutron detecting and neutron density indicating means can be utilized for the exploratory element 25, particularly good results have been experienced by the use of the ionization chamber type apparatus of the general type illustrated in the drawings. The electrical circuit for this apparatus is illustrated in Fig. 7. In this circuit the inner electrode of the ionization chamber is indicated diagrammatically at 59 and the outer spaced electrode is similarly illustrated at 61. The outer electrode 61 is connected to one side of a source 63 of high voltage D. C. power which may be at a battery or an electronic system, and the inner electrode 59 is connected to the other side of the power supply through a potentiometer type high resistance 65. A potentiometer type resistance of approximately 10,000 ohms total resistance has been found to be quite satisfactory for use in connection with a battery of 800 volts and an ionization chamber having an outer electrode about 24 inches long and about 6 inches in diameter, and an inner electrode about three inches in diameter and 20 inches long, the inner electrode 59 being uniformly spaced from the outer electrode 61 and the intervening space being filled with $BF_3$. The visual indicating mechanism of the apparatus includes a galvanometer type indicating instrument 67 which is connected across the potentiometer type resistance 65. The electrical connections to the exploratory element 25 are made via the multi-conductor cable 48 which extends through the duct 49. It will be apparent that the sensitivity of the indicating instrument can be varied by altering the setting of the potentiometer resistor 65.

The complete exploratory unit 23, including the main channel support 33, the trackway members 31 and the carriage which supports the ionization chamber unit 25, is intended to be slidably moved in and out of the passageway 21 in the main shield 19 as a unit. To facilitate handling the unit, a pair of extensions 69, which may comprise fairly heavy metallic strips, are welded to the side flanges of the main channel support 33 and are adapted to extend to the outer surface of the main shield 19 when the exploratory unit 23 is in place in the passageway 21. To aid in accurately locating the exploratory unit 23 in the passageway 21, the outer portion 71 of the passageway 21 is made of a somewhat larger cross-sectional area than the inner portion of the passageway, and the handling members 69 are bent, as illustrated particularly in Fig. 2, so as to engage the shoulders 73 formed at the inner end of the enlarged portion 71 of the passageway 21. If desired, additional means such as parallel guide members 75 (Fig 4) may be imbedded in the concrete of the main shield 19 for assuring correct positioning of the exploratory unit as it is pushed into place.

Although the passageway 21 for the exploratory unit 23 extends tangentially to the contour surface of uniform neutron density adjacent the outer periphery of the neutronic reactor, relatively large neutron densities will be present at the inner end of this passageway during the operation of the reactor, and in the absence of some shielding means substantial quantities of neutrons will be projected out through this passageway. Neutrons so projected would be dangerous to personnel, both because of immediate biological effects and because of the possibility of producing radioactive products in a region of the reactor at which they would be capable of producing future continuing injury. Accordingly, it is practically essential that the outer end of the access passageway 21 for the neutron density indicating means 23 shall be closed by means such as the radiation shield plug 22 when the reactor is in operation. Shield plugs particularly designed for applications of this type are described in my copending application, Serial No. 585,158, which was filed on March 27, 1945, and which is assigned to the assignee of this invention, and such a closure plug is illustrated at 22 in the drawings. The plug 22 includes a channel shaped support 77, preferably of structural steel, having overall outline dimensions just slightly less than the corresponding dimension of the enlarged outer end portion 71 of the passageway 21. The ends of the channel shaped member 77 are closed by blocks 79 of concrete and the space intermediate the two end blocks is filled by alternate layers 81 of paraffin and layers 83 of paraffin containing substantial quantities of small metallic particles, such as steel shot. The paraffin layers 81 act as efficient neutron shields and the interspaced layers 83 of paraffin-metallic particle mixture constitute equally effective shields for gamma or other radiations which may result from the neutron irradiation of the paraffin layers 81 or from some other source. The end blocks 79 and the interspaced layers of paraffin and paraffin metallic shot mixtures are provided with cooperating passageways which define the three tortuous ducts 49, 57, and 54 extending longitudinally of the closure plug 22. These ducts 54 and 57 contain the operating cables 51 and 55 for effecting longitudinal movement of the exploratory element 25 along the passageway 21, and the other duct 49 is occupied by the cable 48 which provides the electrical connections to the ionization chamber 25 and to the selsyn position indicating means.

In the foregoing, I have disclosed the features of an improved neutron density indicating means particularly adapted for embodiment into neutronic reactor systems. The various principles governing the design and construction of apparatus of the invention have been set forth at length and certain specific exemplary structures have been disclosed and described. The features of the invention which are believed to be new are expressly pointed out in the following claims.

What is claimed is:

1. In combination, a neutronic reactor having a central reacting portion, a radiation shield having a passageway extending therethrough disposed about said reactor, neutron density indicating means movable along said passageway, said passageway being so positioned relative to said reacting portion that progressively increasing thicknesses of said shield will be interposed between said indicator means and said reacting portion as said indicating means is moved outwardly along said passageway, and means operable through said shield for moving the neutron density indicating means along said passageway.

2. In combination, a neutronic reactor having a central reacting portion, a radiation shield having a passageway extending therethrough disposed about said reactor, neutron density indicating means movable along said passageway, the inner end of said passageway extending substantially tangential to a contour surface of uniform neutron density adjacent the outer periphery of said reactor whereby increasing thicknesses of said shield will be interposed between said indicating means and said reacting portion as said indicating means is moved outwardly along said passageway, a shield plug disposed in the outer end of the passageway, and means operable through the shield plug to move the neutron density indicating means along the passageway.

3. In combination, a neutronic reactor having a central reacting portion, a radiation shield, having a passageway extending therethrough disposed about said reactor, neutron density indicating means movable along said passageway, said passageway being axially straight and extending substantially tangential to a contour surface of uniform neutron density adjacent the outer periphery of said reactor whereby progressively increasing thicknesses of said shield will be interposed between said indicating means and said reacting portion as said indicator means is moved outwardly along said passageway, a shield plug, and means operable through said shield plug for moving the neutron density indicating means along said passageway.

4. In combination, a neutronic reactor having a central reacting portion, a radiation shield, having a passageway extending therethrough disposed about said reactor, neutron density indicating means including an exploratory element, and a supporting carriage for said element movable along said passageway, said passageway being so positioned relative to said reacting portion that increasing thicknesses of said shield will be interposed between said exploratory element and said reacting portion when said carriage and said exploratory element are moved outwardly along said passageway, a shield plug disposed in the outer end of the passageway, and means operable through said shield plug for moving the supporting carriage along the passageway.

5. In combination, a neutronic reactor having a central reacting portion, a radiation shield, having a passageway extending therethrough, disposed about said reactor, neutron density indicating means including an exploratory element and a supporting carriage for said element movable along said passageway, said passageway being axially straight and extending substantially tangential to a contour surface of uniform neutron density adjacent the outer periphery of said reactor whereby progressively increasing thicknesses of said shield will be interposed between said exploratory element and said reacting portion when said indicator means is moved along said passageway, means operable to indicate the exact linear position of said exploratory unit along said passageway, a shield plug for closing the outer end of said passageway, and means operable through said shield plug for moving the carriage along the passageway.

6. In combination, a neutronic reactor having a central reacting portion, a radiation shield, having a passageway extending therethrough, disposed about said reactor, neutron density indicating means including an exploratory element, a trackway adapted to extend along said passageway, and a supporting carriage for said element movable on said trackway, said passageway being so positioned relative to said reacting portion that differing thicknesses of said shield will be interposed between said exploratory element and said reacting portion when said indicator means is moved along said passageway, means including a selsyn transmitter and receiver units for indicating the exact linear position of said exploratory unit along said passageway, a shield plug for closing the outer end of said passageway, and means operable from outside said shield and said shield plug to move said carriage and said exploratory unit along said passageway.

7. In combination, a neutronic reactor having a central reacting portion, a radiation shield, having a passageway extending therethrough, disposed about said reactor, neutron density indicating means including an exploratory element and a supporting carriage for said element movable along said passageway, said passageway being so positioned relative to said reacting portion that differing thicknesses of said shield will be interposed between said exploratory element and said reacting portion when said indicator means is moved along said passageway, a shield plug for closing the outer end of said passageway comprising a plurality of interspaced layers of neutron shielding material and gamma radiation shielding material, and means operable from outside said shield and said shield plug for moving said carriage and said exploratory unit along said passageway.

8. In combination, a neutronic reactor having a central reacting portion, a radiation shield, having a passageway extending therethrough, disposed about said reactor, neutron density indicating means including an exploratory element and a supporting carriage for said element movable along said passageway, said passageway being so positioned relative to said reacting portion that differing thicknesses of said shield will be interposed between said exploratory element and said reacting portion when said indicator means is moved along said passageway, a shield plug for closing the outer end of said passageway comprising a plurality of interspaced layers of neutron shielding material and gamma radiation shielding material provided with cooperating, aligning passageways which provide at least one tortuous duct through said closure plug, means operable through said duct from outside said shield and said shield plug for moving said carriage and said exploratory unit along said passageway, and means operable to indicate the exact linear position of said carriage and said exploratory unit along said passageway.

References Cited in the file of this patent

UNITED STATES PATENTS 2,094,318    Failla    Sept. 28, 1937